March 29, 1955   T. W. HEISKELL ET AL   2,705,219
PROCESS OF REMOVING NITROGEN TRICHLORIDE FROM CHLORINE GAS
Filed July 18, 1951
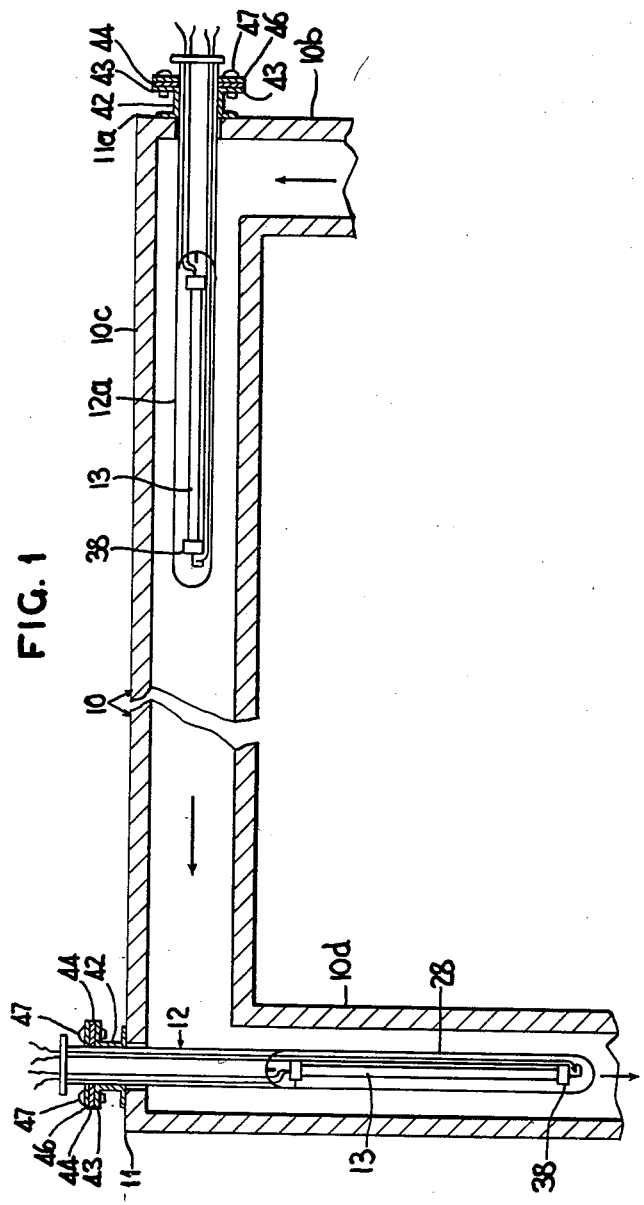
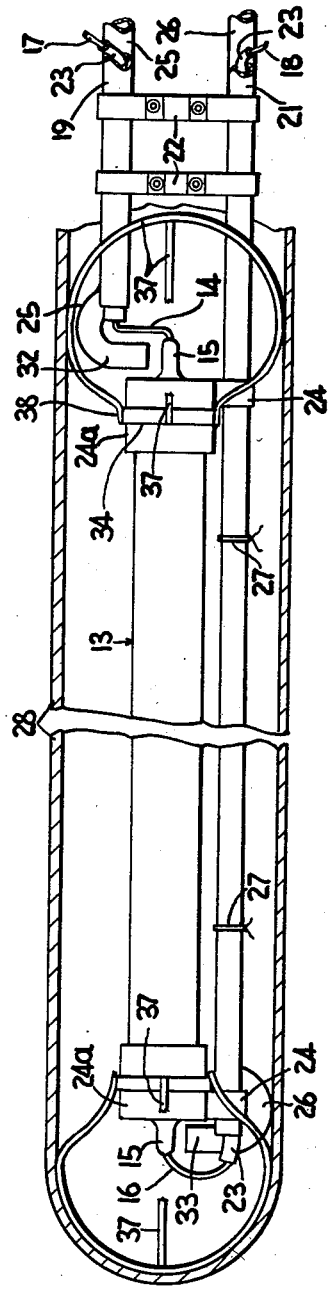
INVENTORS
THEODORE W. HEISKELL and
ALONZO FARMER
Oscar L. Spencer
ATTORNEY

United States Patent Office 2,705,219
Patented Mar. 29, 1955

2,705,219

PROCESS OF REMOVING NITROGEN TRICHLORIDE FROM CHLORINE GAS

Theodore W. Heiskell and Alonzo Farmer, New Martinsville, W. Va., assignors to Columbia-Southern Chemical Corporation, a corporation of Delaware Application July 18, 1951, Serial No. 237,432

2 Claims. (Cl. 204—128)

The present invention relates to the removal of nitrogen trichloride from chlorine and it has particular relation to the removal of said compound from chlorine gas flowing in a conduit employed to conduct the chlorine gas from an electrolytic cell, or more usually from a battery of electrolytic cells in which sodium chloride in a brine is converted into a solution of caustic soda and chlorine is liberated as a gas.

It has heretofore been observed that many brines employed in electrolytic production of caustic and chlorine contain substantial amounts of ammonia. When these brines are subjected to electrolysis to generate chlorine and caustic soda, in accordance with the normal procedures, the ammonia is converted, at least in part into nitrogen trichloride ($NCl_3$) which is carried off as a gas in the mixture of gaseous chlorine and water vapor is produced.

Nitrogen trichloride is violently explosive and in liquid form is extremely sensitive to disturbances of various kinds. This is especially true if the gases are to be subjected to storage in a state which might afford liquid nitrogen trichloride an opportunity to condense out and collect in appreciable amounts.

The present invention comprises the discovery that if the stream of gaseous chlorine containing objectionable amounts of nitrogen trichloride is conducted as a continuous stream from the electrolytic cells, through a field or fields of irradiation where it is exposed to the action of actinic light, much of the nitrogen chloride is destroyed, thus eliminating the hazard of explosion. Thus it has been found that the reduction may be effected during unusually short contact times, for example, less than one or two seconds. Moreover it has been found that where the $NCl_3$ concentration is high, for example 40 to 200 parts per million, only partial decomposition (reducing the $NCl_3$ to approximately 5 to 20 parts per million) satisfactorily eliminates the hazard of explosion whereas undue length of time are required to effect complete destruction of $NCl_3$. It is thus possible to employ brines relatively rich in ammonia and without special treatment to remove the ammonia as a feed for the electrolytic cells.

For a better understanding of the invention, reference may now be had to the accompanying drawing in which:

Fig. 1 illustrates diagrammatically a header conduit provided with an appropriate source of actinic light.

Fig. 2 illustrates diagrammatically an electric arc tube suitable for generating actinic light of high intensity in the conduit.

In the practice of the invention a brine containing appreciable amounts of a nitrogenous material such as ammonia, that will react to form nitrogen trichloride, is employed to feed any conventional electrolytic cell, or usually a battery of such cells (not shown). The design and operation of the cells may be conventional and are not features of this invention. Hence, they are not described.

Chlorine gas from the cells is fed as a continuous stream into conduit such as header 10. The gaseous chlorine from an electrolytic cell will usually contain considerable water vapor, e. g. 0.5 to 50% more or less upon a volume basis, as well as nitrogen trichloride which may be present in amounts usually more than 1 and usually 40 to 200 parts per million. Normally these wet gases are passed through a system of coolers, e. g. have coolers and driers such as sulfuric acid driers, where most of the water vapors are removed and the gases are cooled to desired temperature, e. g. 50° to 80° F. The present invention may be employed in any such system, but inasmuch as the several appurtenances embodied in such system are conventional, it is not deemed necessary to illustrate them.

It is to be understood that the presence or absence of water vapor in the chlorine gas to be treated does not greatly affect the operation of the process. It is also to be understood that temperatures within any reasonable limits are relatively unimportant. Usually, the gas from the cells will be at a temperature of about 160° F., but may be hotter or cooler. This temperature drops as the gas flows along the line practically to room temperature.

In the practice of the present invention the field irradiation of the flowing stream of gases may be set up at substantially any convenient point in the header system from the electrolytic cells, so long as the field is not preceded by a zone where the nitrogen trichloride would be afforded opportunity to condense out. The field may, for example, precede the coolers and dehumidifiers or driers, so that chlorine gases containing a maximum amount of water vapor is irradiated. On the other hand, gases which have been partially or completely pre-dried and/or cooled may be irradiated. A plurality of fields, dependent in number upon the amount of nitrogen trichloride to be removed, the intensity of illumination available, the size and rate of flow of the stream and such like factors, may be employed.

Fields of illumination can be set up anywhere along the chlorine conduit, but usually it is more convenient to set up a field at an elbow or bend, two of which are shown in the drawing at 11 and 11a. In the drawing the lights 12 and 12a (in this instance conventional mercury vapor lights in a transparent tube) are shown as projecting so that they parallel and are coaxial with the flow of gas. Of course, the tubes may project at any other desired angle, but the arrangements shown are quite efficient.

Any convenient generator of actinic light may be employed. Naturally, for reasons of economy, it should emit as much as practicable of its total spectrum in the actinic range, e. g. in wave length, of about 3600 to 4785 Angstrom units. The material of the apparatus should also be adequately resistant to corrosion by chlorine and the envelope should be of high transparency to actinic light. If the header tube is large, e. g. 15 to 30 or 40 inches in diameter, or the flow of gas is rapid, or a minimum number of units is desired, the light should be as bright as is feasible to produce. If small tubes are employed to conduct the chlorine or if very slow rates of flow are permissible, the intensity need not be so great, as in the case of large tubes or rapid rates of flow of gases.

There are various modes for establishing fields of irradiation in the tube for small flows of gaseous chlorine, ordinary tungsten bulbs properly protected from corrosion and supported in conduit 10 in any convenient manner and in any desired size or number to obtain adequate reduction of nitrogen trichloride content of the gases might be sufficient. More often it is preferred to employ a mercury vapor tube, since light from such tube is exceptionally rich in rays of the desired wave length.

One such light is shown in greater detail in Fig. 2. This includes a commercial Hanovia mercury vapor tube which has been slightly modified to admit of efficient operation in the header system of a battery of electrolytic cells producing chlorine from brine. The two lights shown are identical in construction except that one is vertical and the other horizontal. Only one need be described.

This light embodies a tube 13 which preferably is of quartz because of its high transparency to actinic light. However it can be of any other material having reasonable transparency in the desired portion of the spectrum. For example, it may be of a high silica glass, which is cheaper than quartz.

The tube at its ends is sealed in conventional manner and provided with lead-ins 14 and 16 (which are sealed in protuberances 15 on the ends of the tube) to electrodes (not shown). Wires or conductors 17 and 18 carrying current to the lead-ins are disposed in tubes 19 and 21 of Pyrex glass or metal. These tubes may be tied together with clamping members 22 to provide a unit and the conductors may be further covered with insulation material 23. Tube 19 is also secured to tube 13 by means such as bands 24 integral with or welded to caps 24a of heat-resistant metal upon tube 13.

For purposes of cooling the lead-ins 14 and 16 and preventing them or the electrodes from overheating during operation, conduits 25 and 26 for cooling air are provided. These preferably are of heat resistant material such as glass and may be tied to and supported by the tubes 19 and 21, by means of devices such as wires 27. The assembly may be inserted as a unit in an envelope such as a Pyrex thimble 28 shown in Fig. 1. At their upper extremities, the cooling tubes may be united to flexible conduits (not shown) of heat resistant plastic material, leading to a source of air under pressure. The extremities of the tubes 24 and 26 are bent as indicated at 32 and 33 to direct streams of cooling air against the lead-ins.

As shown in Fig. 1 the mercury vapor arc tube 13 is supported in transparent protective thimble 28 by means of a plurality of spring-like loops 37 (one of which for clarity is shown as broken) forming so-called "baskets" 38 which resiliently engage the walls of the thimble in such manner as to hold the tube in substantially coaxial alignment with the thimble 28. These loops may be secured upon caps 24a upon the ends of tube 13 by bands 34.

Any convenient mounting means may be employed to secure the thimble 28 in conduit 10. For example, the latter may be provided at elbows 11 and 11a that join angularly disposed sections 10b—10c and 10c—10d, with integral packing glands 42 having flange 43 upon which is disposed a layer 44 of resilient gasket material. The latter is compressed against the flange 43 and thus squeezed inwardly against the wall of the thimble to provide a gas-tight seal by means of collar 46 secured upon the flange by bolts 47.

In the apparatus shown in the drawings, irradiation is effected with a mercury vapor arc tube of substantial length, e. g. 2 to 5 or 6 feet, and being disposed approximately coaxially with respect to the conduit in which it is exposed.

It is also possible to employ external irradiation of the conduit for gaseous chlorine. For this purpose, a section of the chlorine conduit should be formed of material, having substantial transparency to actinic light. For example, it may be formed of quartz, Pyrex, or the like. External lights may be positioned contiguous to the outer surface of the conduit. With such apparatus, wall effects due to contact of the gases with the walls of the conduit 10 are obviated. Where the light is supplied internally of the conduit, wall effects may partially or completely neutralize the effects of irradiation in a zone extending inwardly several inches from the inner surface of the conduit.

In the apparatus illustrated, two sources of light in series are shown. It, of course, is within the scope of the invention to place a plurality of lights in parallel whereby to increase the intensity of illumunation or to admit of attainment of a predetermined intensity of light with relatively small units. It is also possible to irradiate a transparent conduit externally and simultaneously to increase the intensity of illumination near the axis of the conduit by a suitable light disposed, for example, as shown in the drawing.

A plurality of the lights may be disposed in series or at spaced points along the system so that the gases are exposed to repeated irradiation, with or without admixture or turbulence of the gases so that all portions thereof are adequately exposed to high intensity light at close range. To promote admixing of the gases in the conduit agitators or baffle plates (not shown) may be included in the conduit.

A plurality of sources of light in series as shown in Fig. 1 are especially efficient. These may be spaced to admit of mixing of the gases between lights, whereby to effect more complete irradiation of all portions thereof. A single strong light in a header system will usually remove about 70 or 80% or even 90% by volume of the nitrogen trichloride. Corresponding irradiations in series will remove similar percentages of the remainder at each stage. It is thus possible to reduce the nitrogen trichloride to almost any value by sufficient number of irradiations.

The period of effective irradiation required to attain reasonable reduction of the nitrogen trichloride content varies with the intensity of illumination, especially in the 3600–4785 Angstrom range. However, the period probably will seldom be less than about 0.05 or 0.1 second with the presently available types of lamps. Naturally the upper limit of time of exposure is imposed by the economics of operation and the rate of supply of gases. It seldom will exceed 4 or 5 seconds. The rate of flow of the gases is fixed by the output of the battery, of electrolytic cells being served, and this can not conveniently be changed to meet the demands of the present process. Usually, it is preferable to modify intensity of illumination or to change the period of exposure to irradiation by changing the total length of the field, for example, by adding or subtracting units to attain a desired reduction in nitrogen trichloride content. It is seldom necessary to reduce this content of nitrogen trichloride in air stream below about 1 part per million upon a volume basis of chlorine treated. However such low concentrations are not dangerous. Indeed, it is seldom necessary to reduce the nitrogen trichloride content to such low figures. Often values of 8–20 parts per volume are permissible.

As a general rule, the flow of gases to be irradiated will be in a rate of 750 to 11,000 cubic feet per minute. The energy input in the wave length of 3600 to 4785 Angstrom units is about 0.12 to 20 watts per second per cubic foot of gas being treated for a total period of about 0.25 to 5 seconds.

The following examples illustrate the application of the principles of the invention upon a laboratory scale:

*Example I*

A twenty watt germicidal lamp of 30 inches in length, emitting about 1% of its wattage in the 3600 to 4400 Angstrom range, was placed inside a Pyrex tube of 3 inches in diameter and dried or dehumidified chlorine gas containing nitrogen trichloride was flowed through the field of illumination in the tube. Analysis of the chloride for nitrogen trichloride before metering and after irradiation were conducted. The rates of flow were varied over a broad range to establish a variation in the period of exposure.

The data for the test are tabulated as follows:

| Rate of Flow, liters/min. | Exposure time, seconds | Percent Nitrogen Trichloride | | Percent Removal |
|---|---|---|---|---|
| | | Before exposure | After exposure | |
| 2.0 | 92.5 | 0.0070 | 0.0004 | 94 |
| 5.4 | 34.3 | 0.0071 | 0.0005 | 93 |
| 10.9 | 17.0 | 0.0065 | 0.0009 | 86 |
| 18.9 | 9.8 | 0.0068 | 0.0005 | 93 |
| 23.9 | 7.7 | 0.0077 | 0.0006 | 92 |

Excellent conversions of nitrogen trichloride were attained. The periods of exposure were obviously greater than required, since almost uniform conversions were attained at all rates tested. In a single stage irradiation about 4 to 8 parts per million of nitrogen trichloride remains regardless of the time of exposure.

*Example II*

A twenty watt sun lamp tube of 20 inches in length, emitting about 1% of its wattage in the 3600 to 4400 Angstrom unit range was placed in contact with a conventional Pyrex glass tube of 1.5 inches outside diameter through which the chlorine gas was conducted. The chlorine gas tested was identical with that in Example I. The exposure period was varied from 3.78 down to 1.76 seconds by changing the rate of flow and/or by covering portions of the tube with friction tape. The results attained are tabulated as follows:

| Rate of Flow, liters/min. | Exposure time, seconds | Percent Nitrogen Trichloride | | Percent Removal |
|---|---|---|---|---|
| | | Before exposure | After exposure | |
| 11.0 | 3.78 | 0.0063 | 0.0000 | 100 |
| 11.1 | 3.78 | 0.0069 | 0.0009 | 87 |
| 23.3 | 1.78 | 0.0059 | 0.0009 | 85 |
| 23.7 | 1.76 | 0.0060 | 0.0010 | 83 |

From this data is is apparent that the transmission of the light through Pyrex did not greatly affect the efficiency of the apparatus.

*Example III*

The twenty watt sun lamp of Example II was replaced in this example by a 40-watt lamp of similar spectrum characteristics and a length of 30 inches. The tube was blacked out to a 24-inch exposure length and chlorine gas was fed through as in Example II. The results are tabulated as follows:

| Rate of Flow, liters/min. | Exposure time, seconds | Percent Nitrogen Trichloride | | Percent Removal |
|---|---|---|---|---|
| | | Before exposure | After exposure | |
| 24.2 | 1.72 | 0.0076 | 0.0002 | 97 |
| 24.35 | 1.71 | 0.0064 | 0.0004 | 94 |
| 24.3 | 1.71 | 0.0065 | 0.0006 | 91 |
| 23.7 | 1.76 | 0.0055 | 0.0005 | 91 |
| 23.7 | 1.76 | 0.0060 | 0.0005 | 91 |
| 23.7 | 1.76 | 0.0059 | 0.0008 | 87 |

An excellent conversion of about 91% of nitrogen trichloride was attained.

*Example IV*

In this example, conditions of operation and the apparatus were identical with that in Example III except that the effective field of irradiation was shortened to 18 inches by masking a portion of the tube. The effective period of exposure was 1.21 seconds. The results are tabulated as follows:

| Rate of Flow, liters/min. | Exposure time, seconds | Percent Nitrogen Trichloride | | Percent Removal |
|---|---|---|---|---|
| | | Before exposure | After exposure | |
| 24.3 | 1.21 | 0.0065 | 0.0016 | 76 |
| 24.3 | 1.21 | 0.0061 | 0.0025 | 59 |

*Example V*

The 1.5 inch Pyrex tube previously described in Example IV was employed to carry gas. However, the 20-watt and the 40-watt tubes were employed simultaneously but upon opposite sides of the Pyrex tube. The length of the field of irradiation was 24 inches. The chlorine treated was the same as in the preceding examples. The results of the tests are as follows:

| Rate of Flow, liters/min. | Exposure time, seconds | Percent Nitrogen Trichloride | | Percent Removal |
|---|---|---|---|---|
| | | Before exposure | After exposure | |
| 24.3 | 1.71 | 0.0058 | 0.0006 | 90 |
| 24.3 | 1.71 | 0.0050 | 0.0007 | 86 |
| 24.3 | 1.71 | 0.0054 | 0.0005 | 91 |
| 24.3 | 1.71 | 0.0054 | 0.0006 | 89 |

*Example VI*

In this example a quartz tube of 1 inch outside diameter was substituted for the Pyrex tube of Example V. Conditions were otherwise essentially the same as in Example V.

The data for the run are as follows:

| Rate of Flow, liters/min. | Exposure time, seconds | Percent Nitrogen Trichloride | | Percent Removal |
|---|---|---|---|---|
| | | Before exposure | After exposure | |
| 22.4 | 1.0 | 0.0060 | 0.0004 | 93 |
| 22.4 | 1.0 | 0.0065 | 0.0005 | 92 |
| 23.0 | 0.5 | 0.0063 | 0.0021 | 67 |
| 23.0 | 0.5 | 0.0066 | 0.0020 | 70 |

*Example VII*

In this example the 1 inch quartz tube of the preceding example was employed to conduct the chlorine gas. Irradiation was effected with a so-called "black light" tube of 40 watts capacity, a length of 30 inches, and emitting 10% of its total energy in the 3600–4400 Angstrom range.

The data of this run are tabulated as follows:

| Rate of Flow, liters/min. | Exposure time, seconds | Percent Nitrogen Trichloride | | Percent Removal |
|---|---|---|---|---|
| | | Before exposure | After exposure | |
| 23.0 | 0.25 | 0.0047 | 0.0004 | 92 |
| 23.0 | 0.25 | 0.0052 | 0.0004 | 92 |
| 23.0 | 0.25 | 0.0050 | 0.0005 | 90 |

*Example VIII*

The conditions of this run corresponded to those of Example VI except that the "black light" tube was replaced by the 40-watt sun lamp of the preceding examples.

The data for this run are as follows:

| Rate of Flow, liters/min. | Exposure time, seconds | Percent Nitrogen Trichloride | | Percent Removal |
|---|---|---|---|---|
| | | Before exposure | After exposure | |
| 23.0 | 0.25 | 0.0083 | 0.0030 | 64 |
| 23.0 | 0.25 | 0.0080 | 0.0028 | 65 |

*Example IX*

This example is illustrative of a run upon a full plant scale. In the run, a mercury vapor light tube of high efficiency was employed as a source of illumination. This tube was of 42 inches between electrodes. It was of 4500-watt capacity and had an output of 33% in the 3600–4785 Angstrom range. It was installed in a Pyrex glass thimble of 4½-inch diameter. For purposes of convenience it was placed at an angle 11, in the line 10, which in this instance was of 24 inches internal diameter. Wet chlorine gas was subjected to treatment. The rate of flow of the gases was about 3580 cubic feet per minute. Samples of chlorine before and after irradiation were removed from the conduit 10. After they were dried with concentrated sulfuric acid, they were analyzed for nitrogen-trichloride in routine fashion. In the initial run, the nitrogen-trichloride content of the chlorine being treated was 0.0078% by volume. After treatment, the content was 0.0007% by volume. The removal was 91% complete. In subsequent runs this percentage dropped off slightly but remained relatively constant at about 80 to 84%.

Wall effects and absorption of the light by the gases operate to prevent any great increase of this percentage in a given apparatus. In the gas near the axis of the conduit, the removal of nitrogen trichloride seems to be nearly complete, but the percentage removal drops off in the outer layers of gas, firstly by absorption of effective rays of light, and secondly owing to wall effects. Little or no light can penetrate beyond 18 or 19 inches from the source. Hence headers of a diameter greater than about 40 inches do not seem desirable. On the other hand, reduction of the diameter of the header brings the walls of the header closer to the light and restricts the diameter of the zone of effective conversion. The percentage of gas in the zone subject to wall effects increases. However it is to be understood that some conversion can be effected in headers of either greater or lesser diameters and reduction to a minimum of about 15 inches is permissible. Smaller conduits are quite inefficient from a light efficiency standpoint.

It is quite possible, as already stated, to reduce the nitrogen trichloride content of the gas stream to very low values, e. g. 2 parts per million or even less by sufficient number of spaced zones of irradiation. Each takes out about 70 or 80 or possibly 90% of the nitrogen chloride present in the gas passing through the zone. Any number of zones required to attain a desired removal of nitrogen trichloride can be introduced. However, practical consideration of increased costs and diminishing returns usually place a limit at about 6 or 8 or perhaps 10 zones. These are quite adequate for nearly all practical purposes.

The chlorine gas when treated in accordance with the provisions of the present invention can be stored as a gas or as a liquid under pressure for an indefinite period without danger of explosion. Usually it is stored as a liquid under pressure in steel cylinders. Chlorine containing substantial amounts of nitrogen trichloride when so stored presents a hazard because of a strong tendency of the latter to increase in concentration as the chlorine is used up.

We claim:

1. In a method of electrolytically producing gaseous chlorine from a brine containing ammonia, and the subsequent recovery of said chlorine, in which method nitrogen trichloride is produced as a contaminant in said chlorine, the improvement which comprises subjecting the electrolytically produced gaseous chlorine as a flowing stream in a conduit leading to said recovery to actinic radiation of a wave length effective to decompose the nitrogen trichloride for a time sufficient to achieve the reduction of the nitrogen trichloride content of the gaseous chlorine to below 20 parts per million upon a volume basis.

2. In a method of electrolytically producing gaseous chlorine from a brine containing ammonia, and the subsequent recovery of said chlorine, in which method nitrogen trichloride is produced as a contaminant in said chlorine, the improvement which comprises subjecting the electrolytically produced gaseous chlorine as a flowing stream in a conduit leading to said recovery to actinic radiation of a wavelength of 3600–4785 A°. for a time sufficient to achieve the reduction of the nitrogen trichloride content of the gaseous chlorine to below 20 parts per million upon a volume basis.

References Cited in the file of this patent

UNITED STATES PATENTS

| | | |
|---|---|---|
| 271,906 | Nolf | Feb. 6, 1883 |
| 895,159 | Carrier | Aug. 4, 1908 |
| 2,316,685 | Gardiner | Apr. 13, 1943 |
| 2,530,699 | Humphrey et al. | Nov. 21, 1950 |
| 2,534,485 | Towle | Dec. 19, 1950 |
| 2,572,913 | Calfee et al. | Oct. 30, 1951 |